US008105019B2

(12) United States Patent  (10) Patent No.: US 8,105,019 B2
McCaffrey et al.  (45) Date of Patent: Jan. 31, 2012

(54) 3D CONTOURED VANE ENDWALL FOR VARIABLE AREA TURBINE VANE ARRANGEMENT

(75) Inventors: Michael G. McCaffrey, Windsor, CT (US); Eric A. Hudson, Harwinton, CT (US); James D. Hill, Tolland, CT (US); Shankar S. Magge, South Windsor, CT (US); Joel H. Wagner, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 1045 days.

(21) Appl. No.: 11/953,478

(22) Filed: Dec. 10, 2007

(65) Prior Publication Data

US 2009/0148282 A1  Jun. 11, 2009

(51) Int. Cl.
*F01D 9/02* (2006.01)
(52) U.S. Cl. ...................................................... 415/160
(58) Field of Classification Search .................. 415/161, 415/160, 159
See application file for complete search history.

(56) References Cited

U.S. PATENT DOCUMENTS

| 4,193,738 A | * | 3/1980 | Landis et al. ................. 415/160 |
| 4,278,398 A | * | 7/1981 | Hull ............................. 415/160 |
| 4,834,613 A | | 5/1989 | Hansen |
| 5,039,277 A | | 8/1991 | Naudet |
| 5,190,439 A | | 3/1993 | Das |
| 5,281,087 A | | 1/1994 | Hines |
| 5,622,473 A | | 4/1997 | Payling |
| 5,806,303 A | | 9/1998 | Johnson |
| 5,807,072 A | | 9/1998 | Payling |
| 5,809,772 A | | 9/1998 | Giffin, III et al. |
| 5,931,636 A | | 8/1999 | Savage et al. |
| 5,941,537 A | | 8/1999 | Wallace et al. |
| 5,961,278 A | | 10/1999 | Dorais et al. |
| 5,988,890 A | | 11/1999 | Uematsu et al. |
| 6,102,329 A | | 8/2000 | Guinan et al. |
| 6,146,093 A | | 11/2000 | Lammas |
| 6,179,559 B1 | * | 1/2001 | Weaver ........................ 415/161 |
| 6,210,106 B1 | | 4/2001 | Hawkins |
| 6,419,464 B1 | | 7/2002 | Arnold |
| 6,438,941 B1 | | 8/2002 | Elliott et al. |
| 6,532,731 B2 | | 3/2003 | Springer |
| 6,536,216 B2 | | 3/2003 | Halila et al. |
| 6,602,049 B2 | * | 8/2003 | Caubet et al. ................. 415/160 |
| 6,629,817 B2 | | 10/2003 | Shelton et al. |
| 6,681,558 B2 | | 1/2004 | Orlando et al. |
| 6,684,626 B1 | | 2/2004 | Orlando et al. |

(Continued)

FOREIGN PATENT DOCUMENTS

EP  1256697  11/2002

(Continued)

OTHER PUBLICATIONS

JP 01-237328 A English Translation. USPTO. Schreiber Translation, Inc. May 2011. pp. 1-9.*

(Continued)

*Primary Examiner* — Richard Edgar
(74) *Attorney, Agent, or Firm* — Carlson Gaskey & Olds, P.C.

(57) ABSTRACT

A turbine section of a gas turbine engine includes an arcuate vane platform segment having a substantially flat surface over which a rotational turbine vane may swing.

20 Claims, 5 Drawing Sheets

U.S. PATENT DOCUMENTS

| | | |
|---|---|---|
| 6,711,887 B2 | 3/2004 | Orlando et al. |
| 6,729,575 B2 | 5/2004 | Bevilaqua |
| 6,763,652 B2 | 7/2004 | Baughman et al. |
| 6,763,653 B2 | 7/2004 | Orlando et al. |
| 6,763,654 B2 | 7/2004 | Orlando et al. |
| 6,808,364 B2 | 10/2004 | O'Reilly |
| 6,901,739 B2 | 6/2005 | Christopherson |
| 6,984,104 B2 | 1/2006 | Alexander |
| 7,004,720 B2 | 2/2006 | Synnott et al. |
| 7,112,039 B2 | 9/2006 | Brooks |
| 7,114,920 B2 | 10/2006 | Synnott |
| 7,116,839 B2 | 10/2006 | Leboeuf |
| 7,134,271 B2 | 11/2006 | Baughman et al. |
| 2005/0047942 A1 | 3/2005 | Grffin, III |
| 2006/0045728 A1 | 3/2006 | Martin et al. |
| 2006/0198982 A1 * | 9/2006 | Holland et al. .............. 428/66.6 |

FOREIGN PATENT DOCUMENTS

| | | |
|---|---|---|
| FR | 2583820 | 12/1986 |
| FR | 2583820 A * | 12/1986 |
| JP | 01237328 A * | 9/1989 |

OTHER PUBLICATIONS

European Search Report mailed Mar. 30, 2009.

* cited by examiner

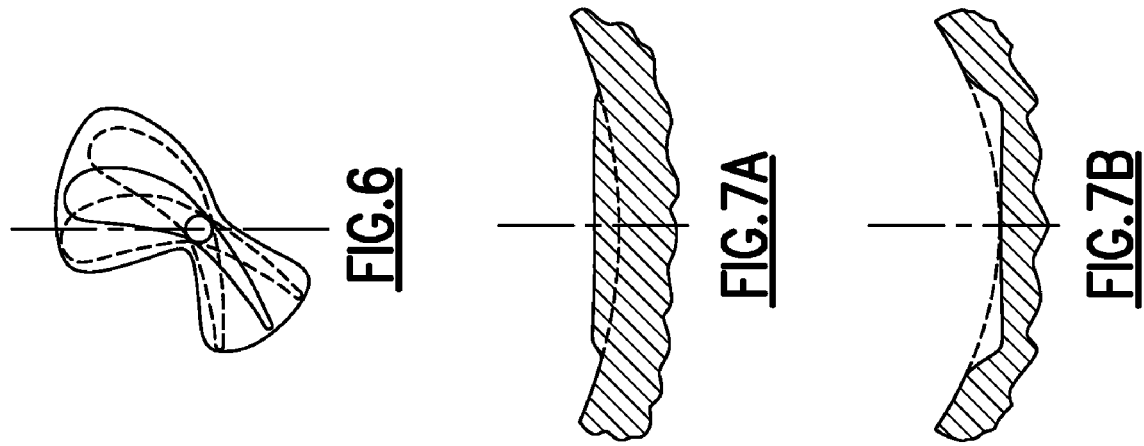
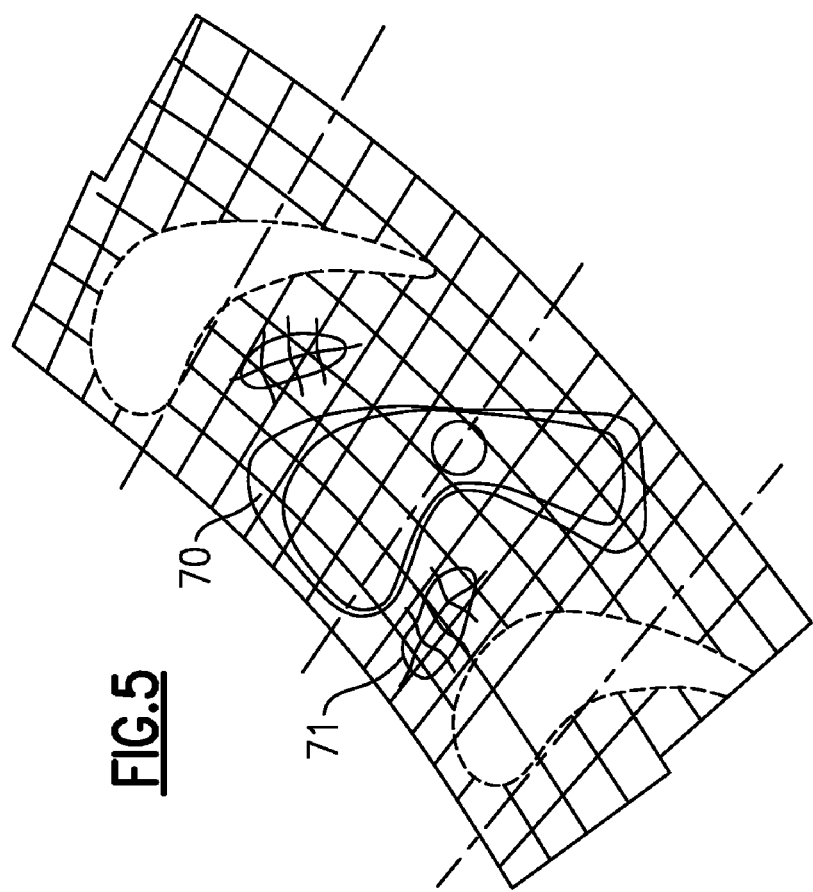

3D CONTOURED VANE ENDWALL FOR VARIABLE AREA TURBINE VANE ARRANGEMENT

BACKGROUND OF THE INVENTION

The present invention relates to a gas turbine engine, and more particularly to an arcuate vane platform segment having a substantially flat surface over which a rotational turbine vane swings.

The core engine of a gas turbine engine typically includes a multistage axial compressor which provides compressed air to a combustor wherein it is mixed with fuel and ignited for generating hot combustion gas which flows downstream through a high pressure turbine nozzle and in turn through one or more stages of turbine rotor blades. The high pressure turbine blades are joined to a rotor disk which is joined to the compressor by a corresponding drive shaft, with the turbine blades extracting energy for powering the compressor during operation. In a two spool engine, a second shaft joins a fan upstream of the compressor to a low pressure turbine disposed downstream from the high pressure turbine.

Typical turbine nozzles, such as high pressure and low pressure turbine nozzles, have fixed vane configurations and fixed turbine nozzle throat areas. Variable cycle engines are being developed to maximize performance and efficiency over subsonic and supersonic flight conditions. Some engines provide variability in compressor vanes by mounting each vane on a radial spindle and collectively rotating each row of compressor vanes using an annular unison ring attached to corresponding lever arms joined to each of the spindles. Each compressor vane rotates about a radial axis, with suitable hub and tip clearances which permit rotation of the vanes.

Although it would be desirable to obtain variable flow through turbine nozzles by adjusting the throat areas thereof, previous attempts thereat have proved difficult because of the turbine nozzles severe operating environment. Adjustable turbine nozzle vanes may reduce the structural integrity and durability of the nozzle segments in view of the increased degree of freedom therebetween. Furthermore, it may be difficult to seal the movable portion of the airfoil because the flowpath wall is cylindrical, conical, or otherwise curved in nature.

SUMMARY OF THE INVENTION

A turbine section of a gas turbine engine accordingly to an exemplary aspect of the present invention includes an arcuate vane platform segment having a substantially flat surface and a rotational turbine vane segment adjacent the substantially flat surface.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 5 is a perspective partial phantom view of the turbine section of FIG. 4 illustrating a faceted surface;

FIG. 6 is a top schematic view of a single rotatable turbine vane and the flat area over which the rotatable turbine vane may rotate;

FIG. 7A is a sectional view of an arcuate vane platform with a raised flat surface;

FIG. 7B is a sectional view of an arcuate vane platform with a recessed flat surface;

DETAILED DESCRIPTION OF THE DISCLOSED EMBODIMENT

Figure 1:
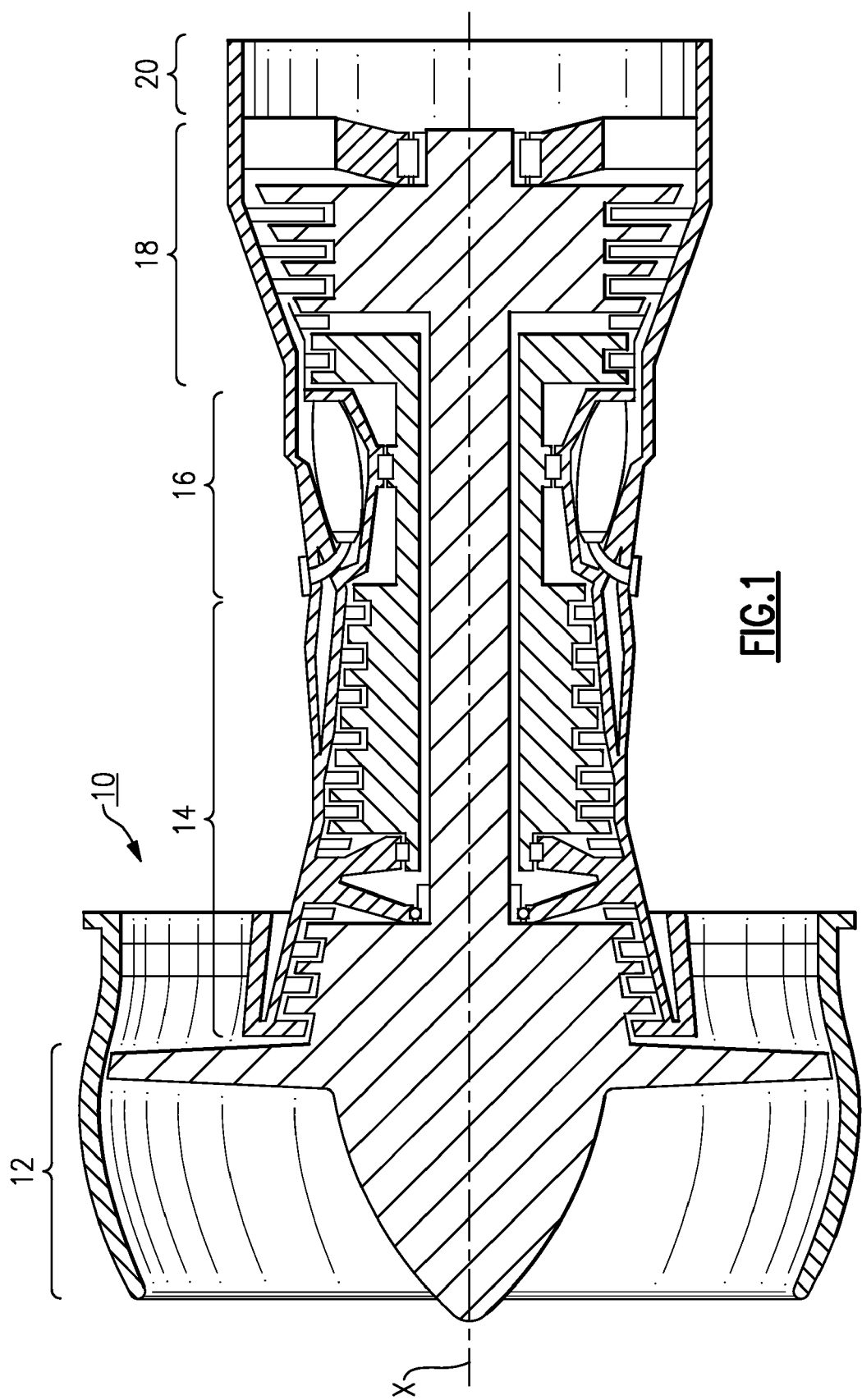
FIG. 1 is a general schematic sectional view of a gas turbine engine for use with one non-limiting embodiment of the present invention.

FIG. 1 schematically illustrates a gas turbine engine 10 which generally includes a fan section 12, a compressor section 14, a combustor section 16, and a turbine section 18, and a nozzle section 20 along a longitudinal axis X. Air is compressed in the compressor section 14, mixed with fuel and burned in the combustor section 16 to produce hot gasses that are expanded in the turbine section 18. Although the disclosed embodiment illustrates a particular gas turbine turbofan engine, the presentation is schematic for illustrative purposes only and is not a limitation on the disclosed examples. Additionally, there are various types of gas turbine engines, many of which could benefit from the examples disclosed herein and are not limited to the designs shown.

The engine 10 is configured to provide a variable area turbine nozzle to selectively control the flow from the compressor section 14 through the turbine section 18. The engine 10 may also be referred to as including a Controlled Area Turbine Nozzle (CATN).

Figure 2:
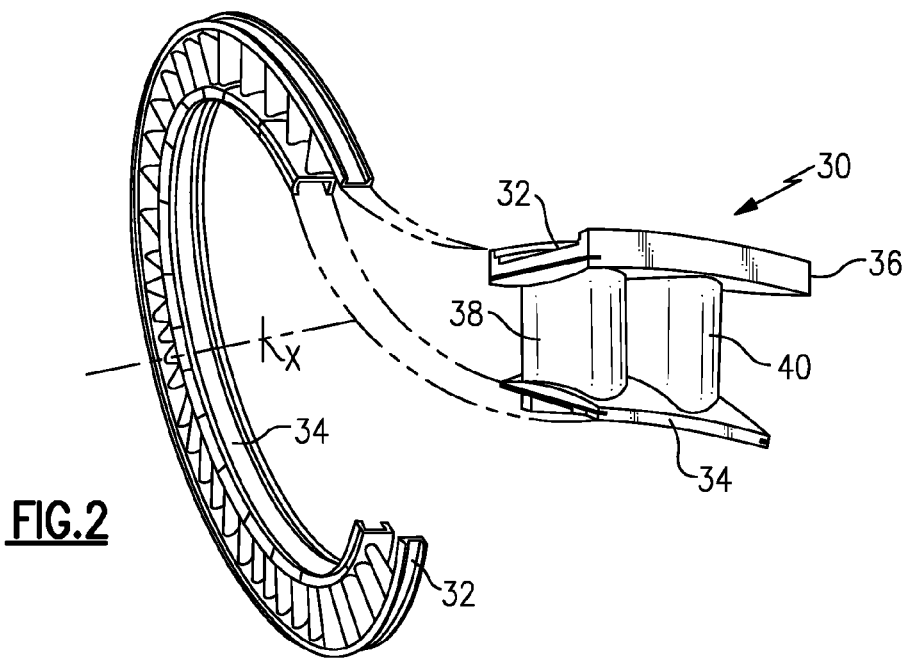
FIG. 2 is an expanded view of a vane portion of one turbine stage within a turbine section of the gas turbine engine, the vane portion formed from a multiple of segments.

Referring to FIG. 2, a turbine nozzle segment 30 includes an arcuate outer vane platform segment 32 and an arcuate inner vane platform segment 34 radially spaced apart from each other. The arcuate outer vane platform segment 32 may form a portion of an outer core engine structure and the arcuate inner vane platform segment may form a portion of an inner core engine structure to at least partially define an annular turbine nozzle core gas flow path.

The circumferentially adjacent vane platform segments 32, 34 define split lines 36 which thermally uncouple adjacent turbine nozzle segments 30 which may be conventionally sealed therebetween, with, for example only, spline seals. That is, the temperature environment of the turbine section 18 and the substantial aerodynamic and thermal loads are accommodated by the plurality of circumferentially adjoining nozzle segments 30 which collectively form a full, annular ring about the centerline axis X of the engine.

Each turbine nozzle segment 30 includes a multiple (two shown) of circumferentially spaced apart turbine vanes 38, 40 which extend radially between the vane platform segments 32, 34. In the disclosed embodiment, each nozzle segment 30 (doublet) includes one fixed turbine vane 38 and one rotational turbine vane 40 between the vane platform segments 32, 34 to provide a rigid structural assembly which accommodates thermal and aerodynamic loads during operation. That is, the full, annular ring formed by the multiple of turbine nozzle segments 30 provide a vane portion of one stage in the turbine section 18 which is defined by the alternating fixed and rotational turbine vanes 38, 40.

Figure 3:
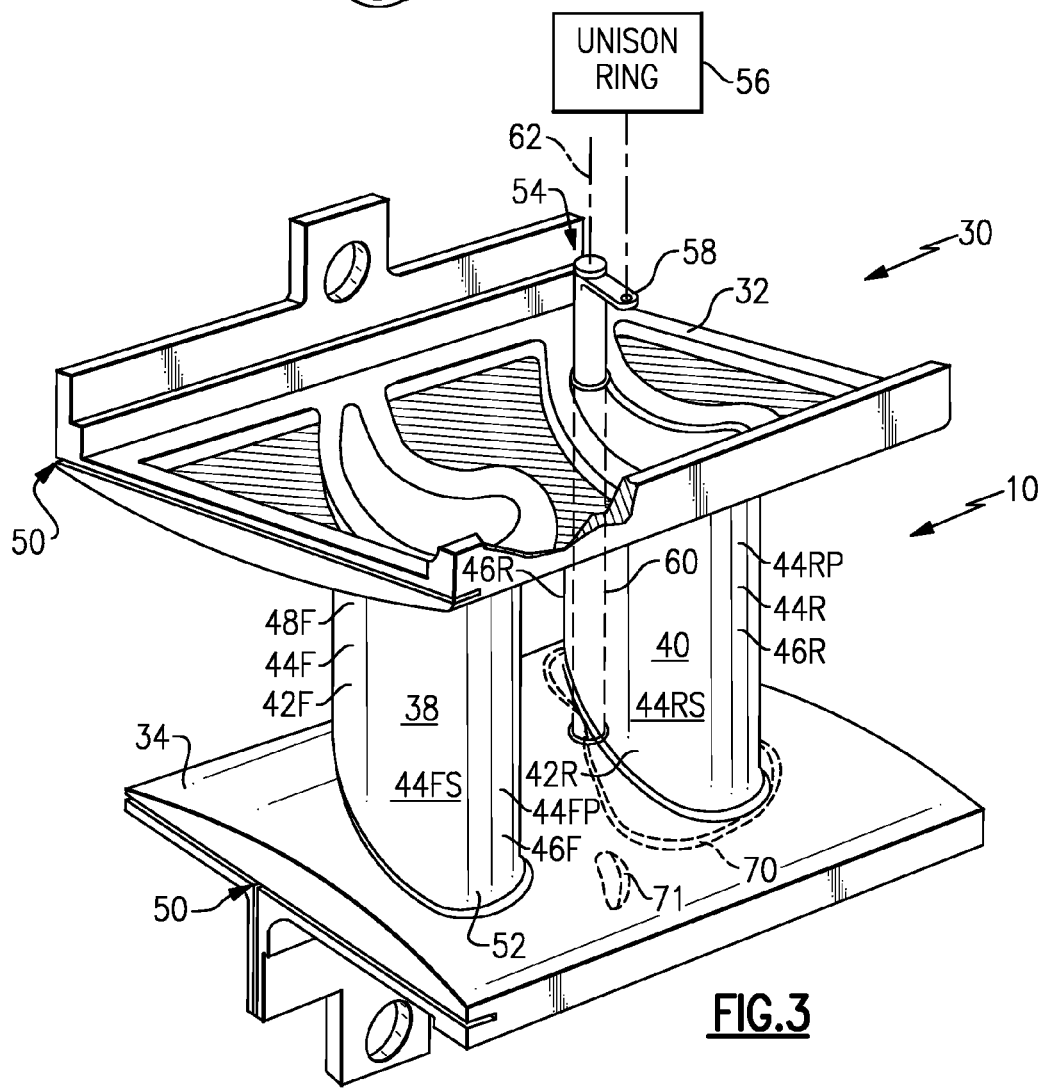
FIG. 3 is an expanded partial phantom view of one variable turbine nozzle segment.

Referring to FIG. 3, each turbine nozzle segment 30 may include at least one fixed turbine vane 38 and at least one rotational turbine vane 40 such that the fixed turbine vane 38 and the vane platform segments 32, 34 form a box structure. The vane platform segments 32, 34 may include features 50 to mount each nozzle segment 30 to other engine static structures. It should be understood that although the illustrated embodiment discloses a doublet arrangement, any number of fixed turbine vanes 38 and rotational turbine vanes 40 may be provided in each turbine nozzle segment 30. Movement of the rotational turbine vanes 40 relative the adjacent fixed turbine vanes 38 effectuates a change in throat area formed by the ring of nozzle segments 30.

Referring to FIG. 3, each turbine vane 38, 40 includes a respective airfoil portion 42F, 42R defined by an outer airfoil wall surface 44F 44R between the leading edge 46F, 46R and a trailing edge 48F, 48R. Each turbine vane 38, 40 may include a fillet 52 to provide a transition between the airfoil portion 42F, 42R and the vane platform segments 32, 34. The outer airfoil wall surface 44 is typically shaped for use in, for example only, a first stage, or other stage, of a high pressure and low pressure stage of the turbine section. The outer airfoil wall 44F, 44R typically have a generally concave shaped portion forming a pressure side 44FP, 44RP and a generally convex shaped portion forming a suction side 44FS, 44RS. It should be understood that respective airfoil portion 42F, 42R defined by the outer airfoil wall surface 44F 44R may be generally equivalent or separately tailored to optimize flow characteristics and transient thermal expansion issues.

An actuator system 54 includes an actuator such as an outer diameter unison ring (illustrated schematically at 56) which rotates an actuator arm 58 and an actuator rod 60 which passes through the outer vane platform segment 32, the rotational turbine vane 40, and the inner vane platform segment 34. The actuator rod 60 rotates each rotational turbine vane 40 about a vane axis of rotation 62 relative the adjacent fixed turbine vanes 38 to selectively vary the turbine nozzle throat area. Since the fixed turbine vane 38 and vane platform segments 32, 34 provide a rigid structure, the rotational turbine vane 40 may include a relatively less complicated rotation, support and sealing structure to provide the variable nozzle throat area capability which minimizes turbine pressure loss, leakage, expense and weight.

Figure 4:
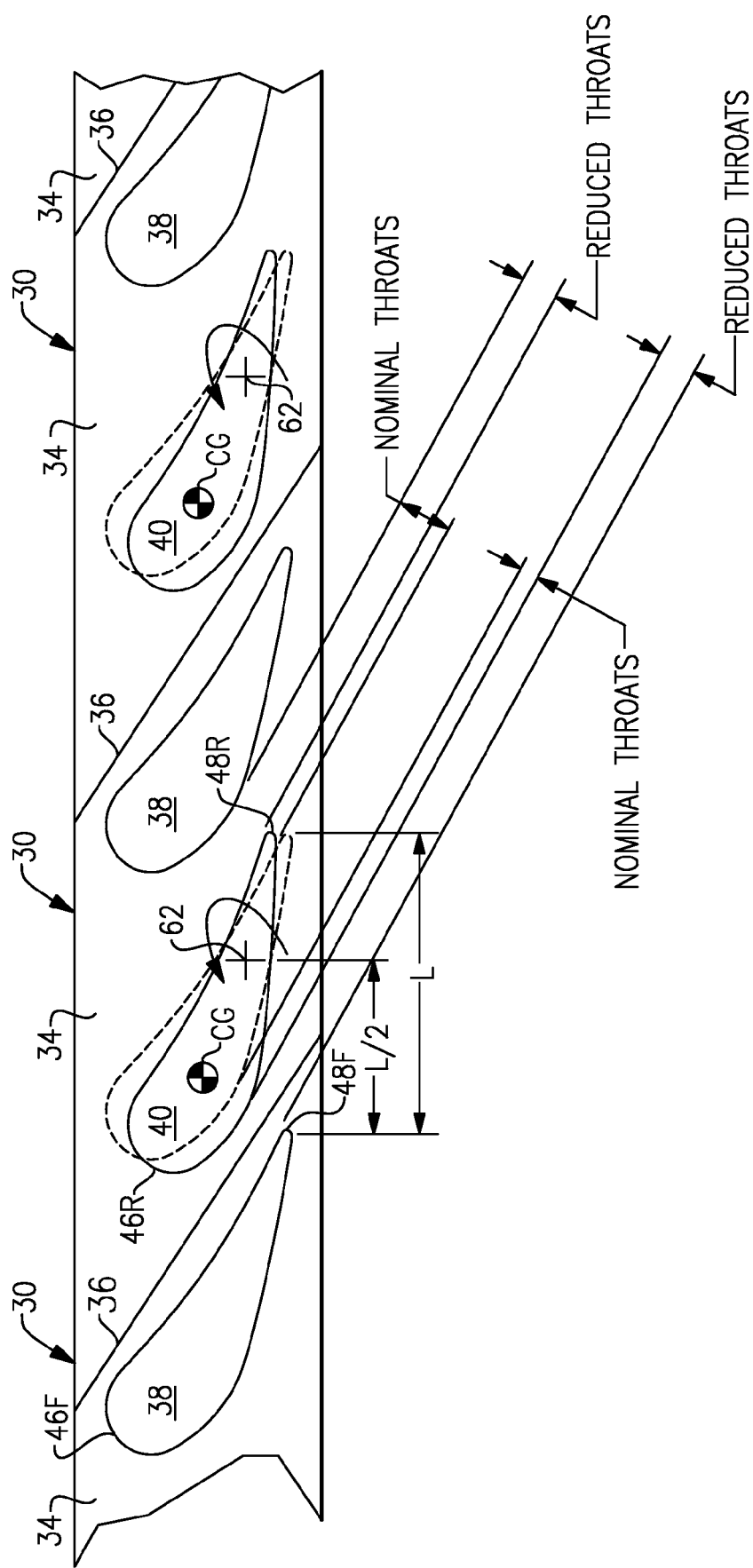
FIG. 4 is a top schematic representation of the throat change performed by the turbine section of FIG. 3.

The vane axis of rotation 62 is located approximately midway between the trailing edges of an adjacent fixed turbine vanes 38 and rotational turbine vane 40 to close the throat area between the rotational turbine vane 40 and the adjacent fixed turbine vanes 38 on either side of the rotational turbine vane 40 simultaneously (FIG. 4).

Rotation of the rotational turbine vanes 40 between a nominal position and a rotated position selectively changes the turbine nozzle throat area as each rotational turbine vane 40 concurrently changes the throat area between itself and both adjacent fixed turbine vanes 38. Since only half the vanes are rotated, the required rotation is less since rotation changes the throat on both sides simultaneously. Furthermore, since only half of the vanes are rotated, the complexity and load requirements of the actuator system 54 are reduced. The alternating rotational-fixed vane arrangement also facilitates a relatively less complicated rotation, support and sealing structure to provide the variable nozzle throat area capability to minimize turbine pressure loss, leakage, expense and weight. It should be understood that although only half the vanes are rotated in the non-limiting embodiment, it should be understood that the present invention is applicable to other movable turbine and compressor vane arrangements as well as other pivotable airfoils.

A substantially flat surface 70 (FIG. 5) is located perpendicular to the axis of rotation 62 and at some shallow angle relative to the inner and outer vane platform segment 32, 34 which are typically of a cylindrical, conical, or other flowpath surface. The flat surface 70 allows the rotational turbine vane 40 to swing across the flat surface 70 with a constant gap. The flat surface 70 is shaped to accommodate the full range of motion of the rotational turbine vane 40 (FIG. 6).

Using 3D Computational Fluid Dynamic analysis, the flowpath wall may be contoured to provide a faceted flowpath so as to essentially eliminate flow disturbances of the which may have otherwise been formed by the presence of the flat surface 70 on the curved outer and inner vane platform segment 32, 34. That is, the flat surface 70 may be built upon (FIG. 7A) or recessed within (FIG. 7B) the outer and inner vane platform segment 32, 34 with essentially no adverse aerodynamic effects though the inclusion of contours 71 which may be located relative the fixed turbine vanes 38 and the rotational turbine vanes 40. The contours 71 are determined through 3D Computational Fluid Dynamic analysis and define the faceted flowpath surface so as to essentially eliminate flow disturbances, which may have otherwise been formed by the presence of the flat surface 70.

Figure 8:
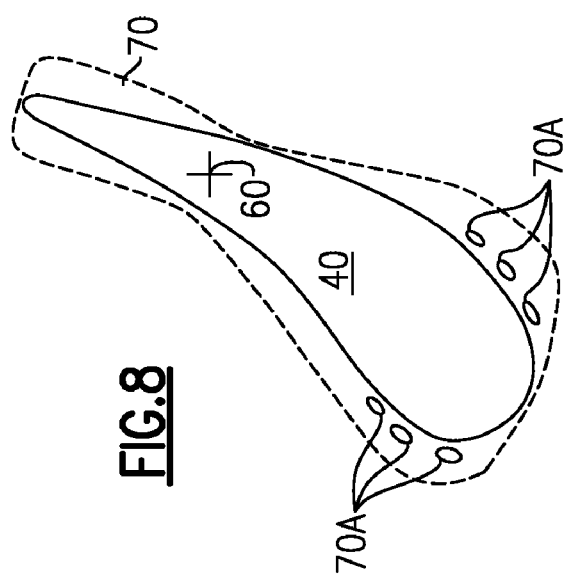
FIG. 8 is a schematic view of a single rotatable vane illustrating a multiple of cooling apertures through the flat surface, the apertures selectively uncovered in response to rotation of the rotational turbine vane.

Referring to FIG. 8 in one non-limiting embodiment, an integrated cooling scheme in which cooling airflow that may include bleed airflow from the compressor section 14 at a pressure higher and temperature lower than the core gas within the turbine section 18 (FIG. 1) may be communicated through cooling apertures 70A located within the flat surface 70 such that as the rotational turbine vane 40 swings, particular cooling apertures 70A are covered or uncovered. The cooling apertures 70A control film cooling over the rotational turbine vane 40 as well as affecting the flow through the flowpath. That is, the 3D Computational Fluid Dynamic analysis may also be utilized to determine the desired flow through the cooling apertures 70A in response to the particular position of the rotational turbine vane 40.

In operation, the rotational turbine vane 40 sweeps across the flat surface 70 and need not be trimmed to avoid contact. Losses associated with the gap are eliminated and the aerodynamic impact of the flat surface 70 in a curved flowpath eliminated. Furthermore, as the rotational turbine vane 40 swings, particular cooling apertures 70A are covered or uncovered to adjust the cooling flow over and around the rotational turbine vane 40.

Figure 9:
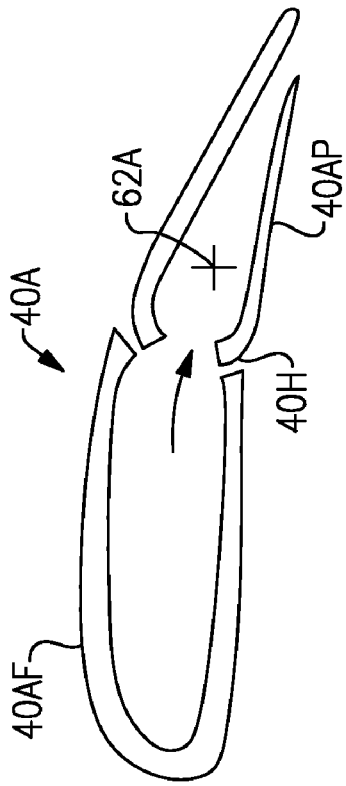
FIG. 9 is a sectional view of another rotatable turbine vane having a fixed airfoil portion and a pivoting airfoil portion.

Referring to FIG. 9, each rotational turbine vane 40A may include a fixed airfoil portion 40AF and a pivoting airfoil portion 40AP which pivots relative to the fixed airfoil portion 40AF. The pivoting airfoil portion 40AP may include a trailing edge flap which is driven about an axis of rotation 62A by an actuator system 54 such as that described above. That is, only the pivoting airfoil portion 40AP pivots about the axis of rotation 62A rather than the entire rotational turbine vane 40.

Figure 11:
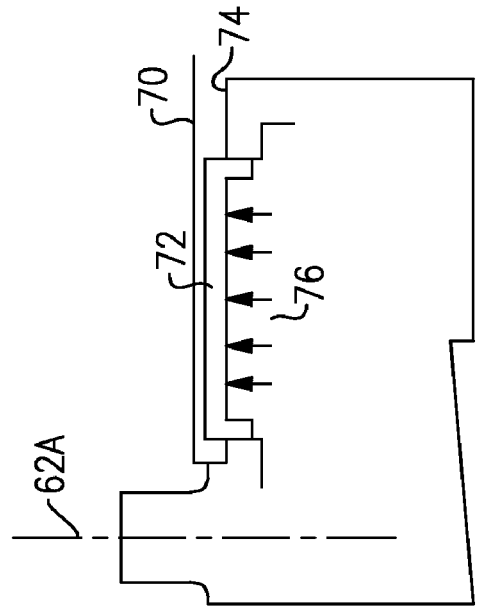
FIG. 11 is a longitudinal sectional view of the rotational portion illustrating a movement of the seal plate.
Figure 10:
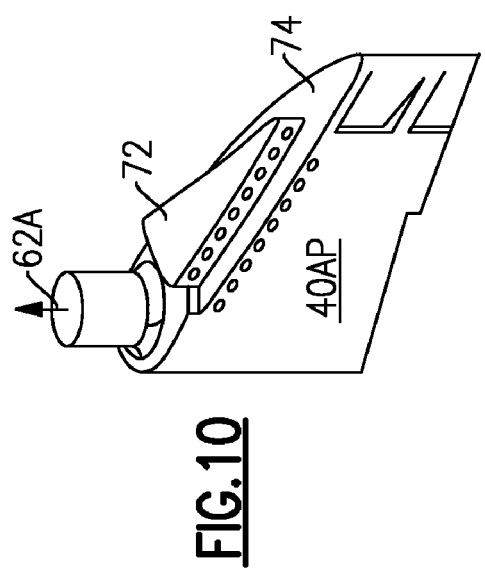
FIG. 10 is a perspective view of the pivotable portion of FIG. 9 illustrating a seal plate.

The pivoting airfoil portion 40AP includes a seal plate 72 (FIG. 10) movable relative to a vane endwall 74 thereof to seal with the flat surface 70 (FIG. 11). The seal plate 72 may be manufactured of, for example only, non-woven CMC or silicon nitride. Although described with regard to only one vane endwall 74 of the pivoting airfoil portion 40AP, it should be understood that the seal plate 72 may be located in either an outer endwall 74 adjacent the outer vane platform segment 32, an inner vane endwall 74 adjacent the inner vane platform segment 34 or both.

The seal plate 72 is movable relative to the vane endwall 74 generally parallel to the axis of rotation 62A in response to a mechanical, electrical, hydraulic, and/or pneumatic system 76 (FIG. 11). That is, the seal plate 72 may be mechanical or pressure loaded against the flat surface 70. In another non-limiting embodiment, an integrated cooling scheme in which cooling airflow that may include bleed airflow from the compressor section 14 at a pressure higher and temperature lower than the core gas within the turbine section 18 (FIG. 1) may be communicated into the fixed airfoil portion 40AF then communicated through a hinge area 40H between the fixed airfoil portion 40AF and the pivoting airfoil portion 40AP.

That is, cooling airflow which is conventionally utilized to high temperature areas of the airfoil such as an airfoil leading edge may additionally be utilized to pressurize the seal plate 72 into contact with the vane endwall 74. Secondary airflow from, for example only, from an integrated cooling scheme may additionally or alternatively be utilized to purge the hinge and pressurize the seal plate 72.

It should be understood that relative positional terms such as "forward," "aft," "upper," "lower," "above," "below," and the like are with reference to the normal operational attitude of the device and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A turbine nozzle segment for a gas turbine engine comprising:
    an arcuate vane platform segment having a substantially flat surface;
    a rotational turbine vane rotatable about an axis of rotation over said substantially flat surface; and
    a contour adjacent said arcuate vane platform segment to define a faceted flowpath surface.

2. The turbine nozzle segment as recited in claim 1, wherein said faceted flowpath surface minimizes flow disturbances from said substantially flat surface.

3. The turbine nozzle segment as recited in claim 1, further comprising a seal plate movable relative to a vane endwall of said rotational turbine vane segment generally parallel to said axis of rotation.

4. The turbine nozzle segment as recited in claim 3, wherein said seal plate contacts said substantially flat surface.

5. The turbine nozzle segment as recited in claim 3, wherein said seal plate is pressure loaded toward said substantially flat surface.

6. The turbine nozzle segment as recited in claim 3, wherein said seal plate is mechanically loaded toward said substantially flat surface.

7. The turbine nozzle segment as recited in claim 1, wherein said substantially flat surface is airfoil shaped.

8. The turbine nozzle segment as recited in claim 1, wherein said rotational turbine vane comprises a fixed airfoil portion and a pivoting airfoil portion which pivots relative to said fixed airfoil portion, said pivoting airfoil portion adjacent said substantially flat surface.

9. The turbine nozzle segment as recited in claim 8, wherein said substantially flat surface is airfoil shaped to correspond with said pivoting airfoil portion.

10. The turbine nozzle segment as recited in claim 1, wherein said arcuate vane platform is an inner arcuate vane platform.

11. The turbine nozzle segment as recited in claim 1, wherein said arcuate vane platform is an outer arcuate vane platform.

12. The turbine nozzle segment as recited in claim 1, wherein said substantially flat surface is recessed relative said arcuate vane platform segment.

13. The turbine nozzle segment as recited in claim 1, wherein said substantially at surface is raised relative said arcuate vane platform segment.

14. A method of varying a turbine nozzle throat area of a gas turbine engine comprising:
    locating a rotational turbine vane adjacent to a substantially flat surface between a first fixed turbine vane and a second fixed turbine vane;
    locating contours adjacent the substantially flat surface to define a faceted surface which minimizes flow disturbances from the substantially flat surface; and
    rotating the rotational turbine vane about an axis of rotation over said substantially flat surface to vary a throat area concurrently between the rotational stator vane and both the first fixed turbine vane and the second fixed turbine vane.

15. A method as recited in claim 14, further comprises:
    pressurizing a seal plate relative to an endwall of said rotational turbine vane to maintain contact with said substantially flat surface.

16. A method as recited in claim 14, further comprises:
    rotating a pivoting segment of the rotational turbine vane about an axis of rotation.

17. A method as recited in claim 14, further comprising:
    selectively covering and uncovering cooling apertures through the substantially flat surface in response to rotation of the rotating turbine vane.

18. A turbine nozzle segment for a gas turbine engine comprising:
    an arcuate vane platform segment having a substantially flat surface; and
    a rotational turbine vane rotatable about an axis of rotation over said substantially flat surface; and
    a contour adjacent said arcuate vane platform segment to define a faceted flowpath surface.

19. The turbine nozzle segment as recited in claim 18, wherein said substantially flat surface is contoured to a range of motion of said rotational turbine vane.

20. The turbine nozzle segment as recited in claim 18, wherein said arcuate vane platform is an inner arcuate vane platform.

* * * * *